United States Patent [19]

Cavero

[11] 4,405,966
[45] Sep. 20, 1983

[54] SYSTEM FOR PROVIDING PROTECTION FOR A HIGH VOLTAGE TRANSMISSION LINE

[75] Inventor: Leonardo P. Cavero, Media, Pa.

[73] Assignee: General Electric Company, Philadelphia, Pa.

[21] Appl. No.: 309,549

[22] Filed: Oct. 7, 1981

[51] Int. Cl.³ .......................... H02H 3/26; H02H 7/26
[52] U.S. Cl. ......................................... 361/80; 361/85
[58] Field of Search ........................ 361/80, 85, 81, 78, 361/79, 87; 324/51, 52, 83 R, 83 Q

[56] References Cited

U.S. PATENT DOCUMENTS

| | | | |
|---|---|---|---|
| 4,034,269 | 7/1977 | Wilkinson | 361/79 |
| 4,092,690 | 5/1978 | Wilkinson | 361/80 |
| 4,161,011 | 7/1979 | Wilkinson | 361/80 |
| 4,296,451 | 10/1981 | Wilkinson | 361/80 |
| 4,342,064 | 7/1982 | Wilkinson | 361/80 |

*Primary Examiner*—Patrick R. Salce

*Attorney, Agent, or Firm*—John P. McMahon; William Freedman

[57] ABSTRACT

Disclosed is a system that provides protection for a high voltage transmission line. The system employs improved polarizing and operating signals for both a phase selector relay and a distance measuring relay. The improved polarizing and operating signals provide an accurate out-of-phase relationship during the presence of normal conditions existing on a high voltage transmission line and an in-phase relationship during the presence of fault or abnormal conditions existing on the high voltage transmission line. The accurate phase relationships are utilized by phase comparator circuits of each of the phase selector and distance measuring relays to obtain desired operating characteristics for each relay. In another embodiment, the desired operating characteristics of the phase selector and distance measuring relays are obtained by an amplitude comparator circuit. In a still further embodiment, the distance measuring relay is operated under the control of the phase selector relay so as to provide the proper desired phase selection and protection of the high voltage transmission line.

6 Claims, 10 Drawing Figures

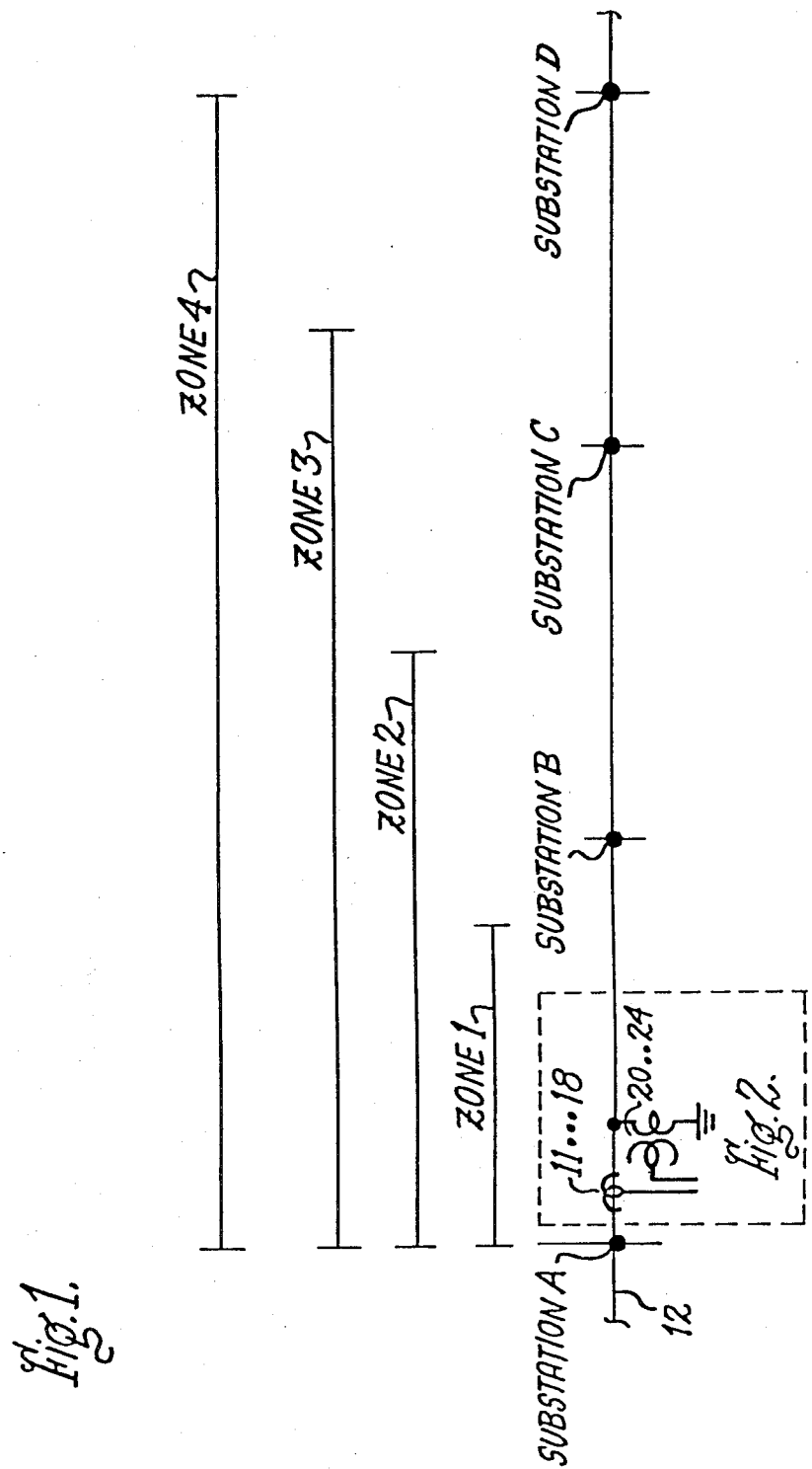

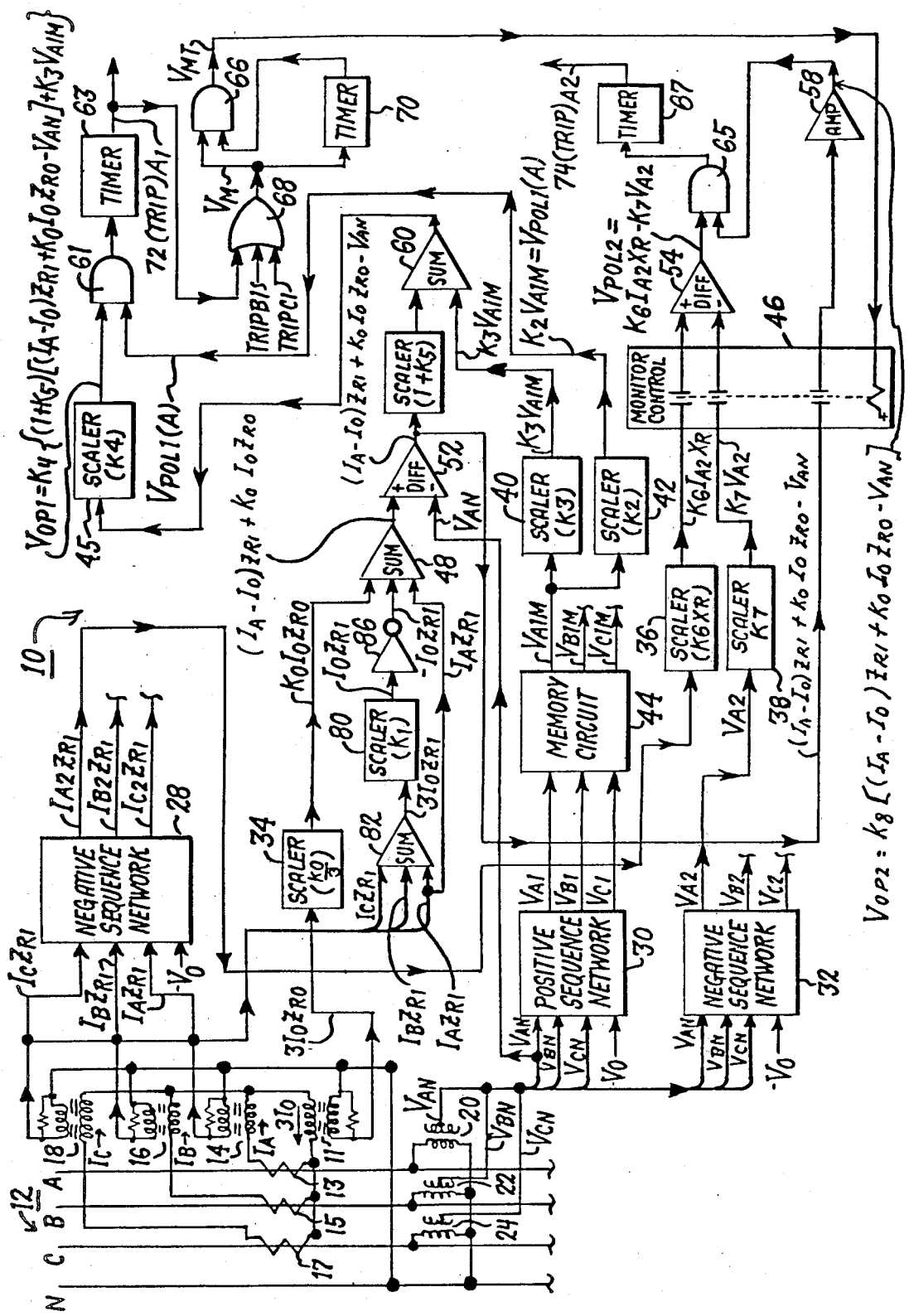

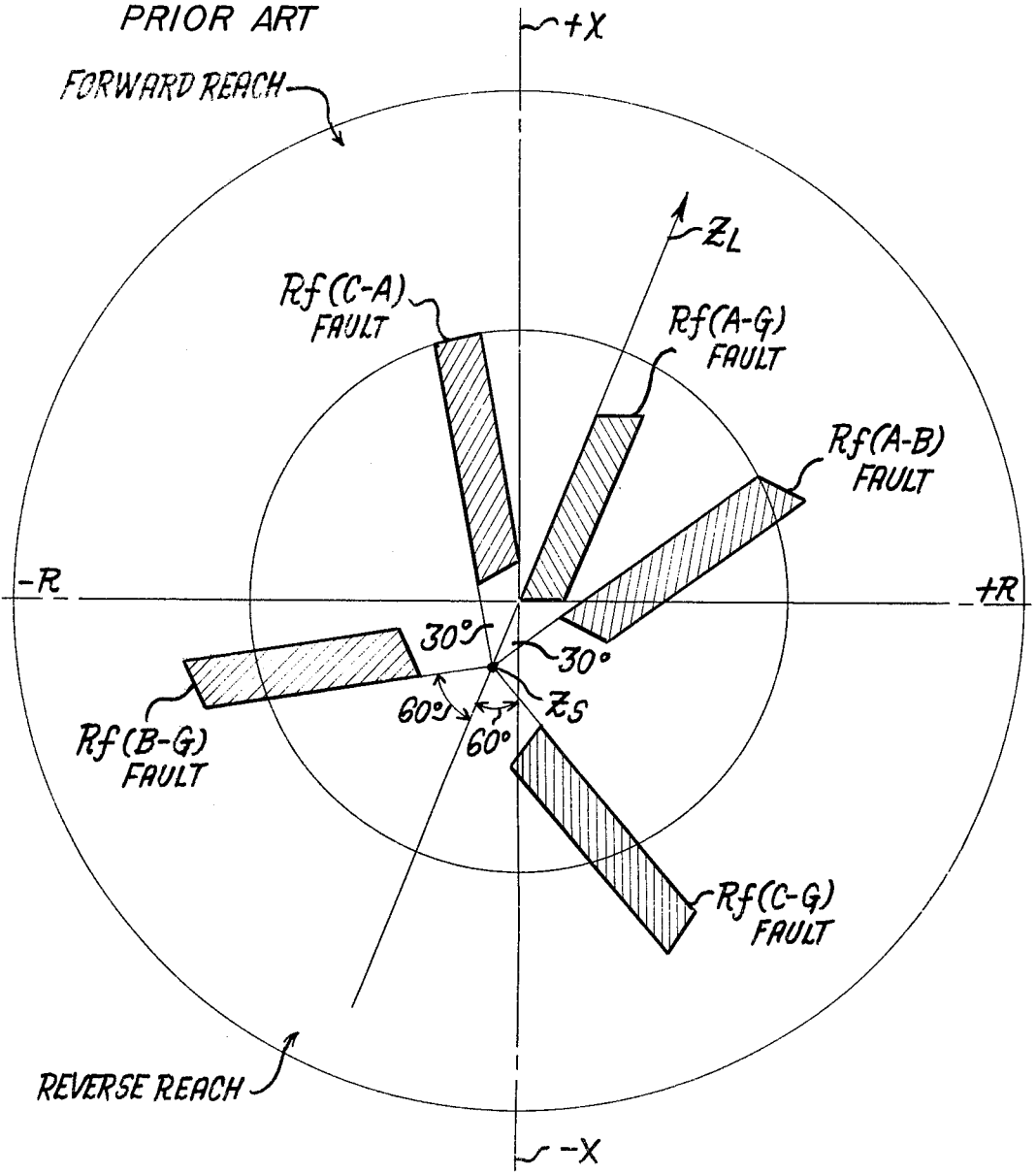

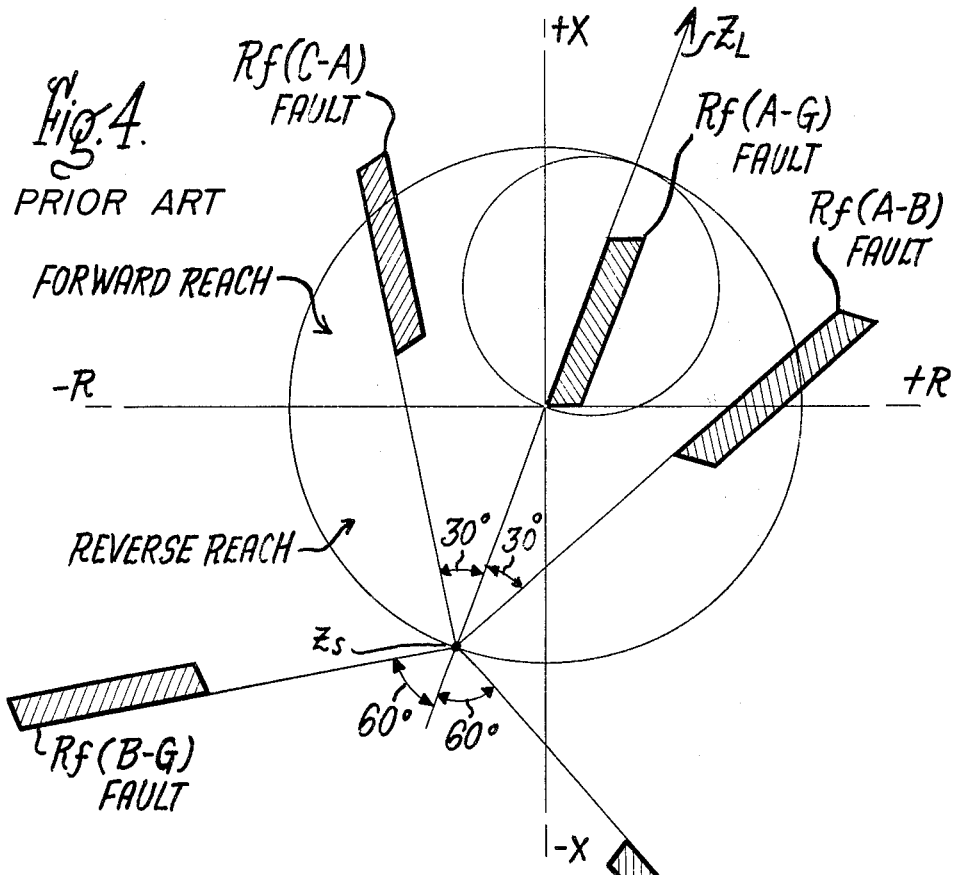
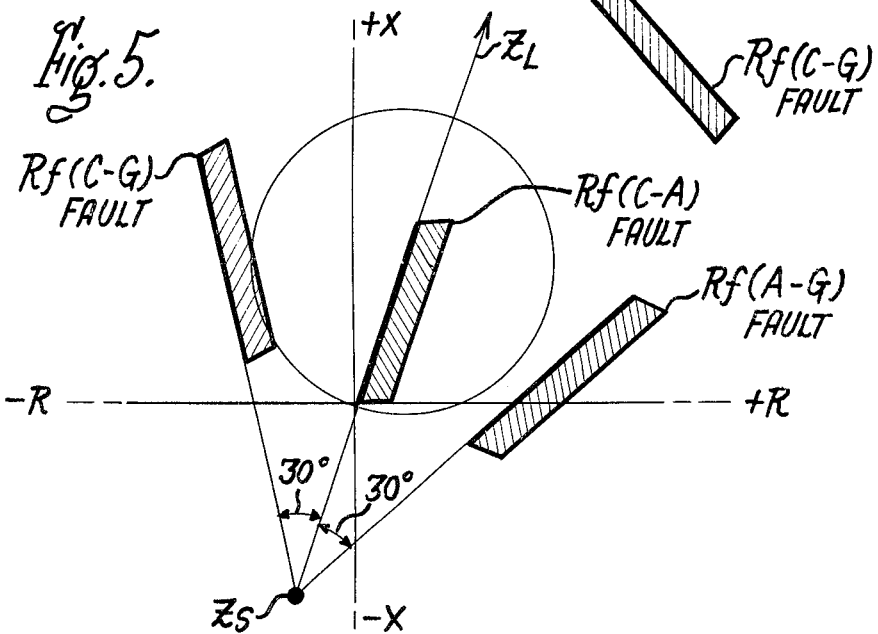

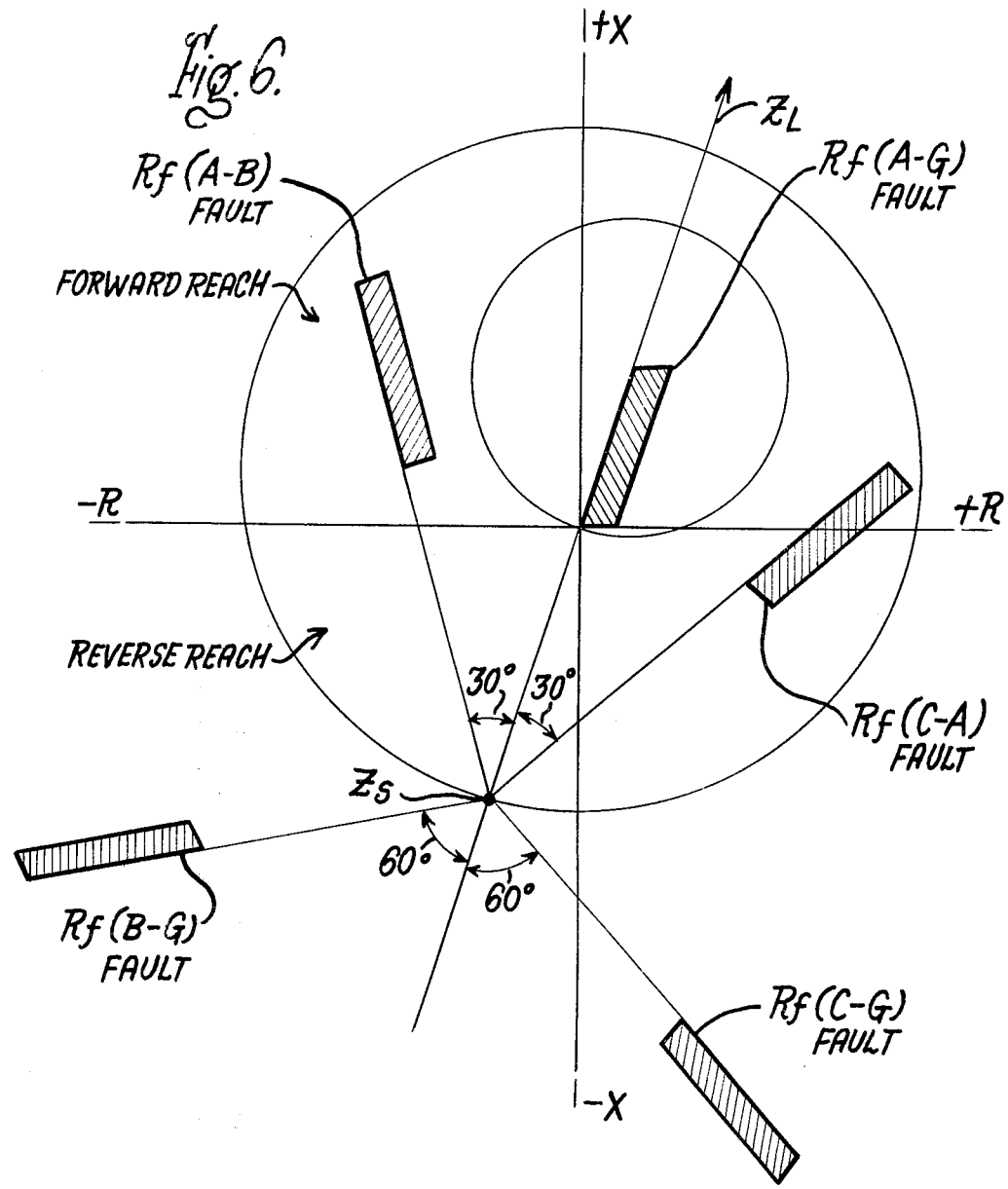

SYSTEM FOR PROVIDING PROTECTION FOR A HIGH VOLTAGE TRANSMISSION LINE

BACKGROUND OF THE INVENTION

The present invention relates to a protective system for a high voltage transmission line, and more particularly, to improved polarizing and operating signals for phase selector and distance measuring relays for the protective system.

Protective systems for high voltage transmission lines sometimes employ phase selector relays and distance measuring relays for detection of fault conditions within the protected portion of the transmission lines. The phase selector for a particular phase A, B, or C, of the transmission line may be connected to the secondary phase-to-ground voltage of the transmission line. Each particular phase selector should only detect faults related to the particular phase. For example, a phase selector relay A should only detect phase A-to-ground faults, phase A-to-B faults or phase C-to-A faults. Furthermore, the phase selector for phase A should not be affected by a phase B-to-ground fault, a phase C-to-ground fault, or a phase B-to-C fault. The single phase discriminating detection operations are desired so that a fault related to a single phase will not cause a three-phase circuit breaker to be activated.

Further, it is desired that the protection of the transmission line remain secure or stable for unfaulted conditions. For example, during the open pole time or period which the faulted phase or phases are disconnected from the transmission line, it is desired that the phase selector and distance relays detect and respond to a fault which may develop on the unfaulted phases of the transmission line.

In addition, it is desired that the phase-selector device does not operate under maximum line-loading conditions, and it is preferable that the phase selector operates only for faults in the selected zones of the transmission line.

The parameter of the phase selectors are commonly selected to correspond to parameters of the desired reach. For example, the phase selector parameters of forward reach may correspond to the forward distance of the protected line. The above discussed preferred detection of faults within the protected line and discriminating detection operation of a phase selector relay are also applicable to distance measuring relays employed in protective systems.

The selected parameter for detecting faults determine, among other things, the operating characteristic of the phase selector and distance measuring relay. The operating characteristics are further determined by comparators, such as phase-comparators, which detect the phase coincidence between operating and polarizing signals, that are responsive to the normal or abnormal conditions existing within the transmission line. Exemplary phase comparator circuits are described in U.S. Pat. Nos. 4,034,269 and 4,161,011 both of which are assigned to the same assignee of the present invention.

The accuracy of each of the phase selector relay and distance measuring relay is directly dependent upon the accuracy of the phase comparator detector, which, in turn, is dependent upon the accuracy of the operating and polarizing signals which detect the presence of normal or abnormal conditions within the desired zone of the transmission line.

Accordingly, it is an object of the present invention to develop operating and polarizing signals for a distance measuring relay that accurately determine the normal and abnormal conditions existing in a desired zone or zones of a transmission line and for phase selector relays that accurately determine the phase or phase directly involved in the abnormal condition.

It is another object of the present invention to provide phase selector and distance measuring relays adapted to be coupled to a high voltage transmission line and which operate in such a manner that a fault related to a single phase of the high voltage transmission line does not cause multiple phase tripping.

It is a further object of the present invention to provide protection of the transmission line that remains secure for the unfaulted conditions.

It is a still further object of the present invention to provide a system comprised of a phase selector relay and a distance measuring device in which the distance measuring relay operates under control of the phase selector. The effect of the system is to reduce the total electrical equipment necessary to implement both the phase selector relay and the distance measuring relay while also improving the performance of each relay.

These and other objects of the present invention will become apparent to those skilled in the art upon consideration of the following description of the invention.

SUMMARY OF THE INVENTION

The present invention is directed to improved polarizing and operating signals for both a phase selector relay and for a distance measuring relay.

In accordance with one preferred embodiment of the invention, a system is comprised of a phase selector relay and a distance measuring relay both for protecting one or more phases of one or more of a high voltage A.C. zones transmission line. The phase selector relay develops a first operating signal $V_{OP1}$ and a first polarizing signal $V_{POL1}$ for each phase of the transmission line and each representative of the current and voltage conditions existing in each of the phases. The distance measuring relay develops a second operate signal $V_{OP2}$ and a second polarizing signal $V_{POL2}$ for each phase of the transmission line and each representative of the current and voltage conditions existing in each of the phases. The protective system further has a first and a second phase angle comparator comprising respectively interconnected first and second AND circuit means and first and second TIMER means. The first AND circuit means is responsive to the phase coincidence between the first operating signal ($V_{OP1}$) and the first polarizing signal ($V_{POL1}$) for developing a first output a signal which is routed to and activates the first TIMER means. The first TIMER means generates a first control signal upon the expiration of a first predetermined time duration. The second AND circuit means is responsive to the first control signal and to the phase coincidence between the second operate signal ($V_{OP2}$) and the second polarizing ($V_{POL2}$) signal for developing a second output signal which is routed to and activates the second TIMER means. The second TIMER means generates a second control signal upon the expiration of a second predetermined time duration. Each of the first and second control signals are adapted to control circuit breaker means for causing the one or more phases of the one or more portions of the transmission line to be decoupled from the remainder of the transmission line. The protective system further comprising means for developing the signals $V_{OP1'}$, $V_{POL1'}$, $V_{OP2}$ and $V_{POL2}$ respectively represented by the following relationships:

$$V_{OP1} = K_4[(1+K_5)[(I_P-I_O)Z_{R1}+K_OI_OZ_{RO}-V_{PN}]+K_3V_{P1M}] \quad (a)$$

where $K_3$, $K_4$ and $K_5$ are phase selector relay constants;

$K_O$ is a zero-sequence line impedance compensation factor substantially equal to the amplitude of the quantity $Z_{LO}/Z_{L1}$, where $Z_{LO}$ is equal to the zero sequence line impedance and $Z_{L1}$ is equal to the positive sequence line impedance;

$I_O$ is the zero-sequence current flowing within the three (3) phase transmission line;

$Z_{R1}$ is the replica positive sequence impedance of the transmission line;

$Z_{RO}$ is the replica positive sequence impedance of the transmission line, but with the phase angle of the zero-sequence impedance of the transmission line;

$I_P$ is representative of the current flowing in the transmission line related to the particular phase of the $V_{OP1}$ signal;

$V_{P1M}$ is the positive sequence component of a pre-faulted transmission line voltage related to the particular phase of the $V_{OP1}$ signal, and;

$V_{PN}$ is the phase-to-neutral voltage of the transmission line related to the particular phase of the $V_{OP1}$ signal;

$$V_{POL1} = K_2 V_{P1M} \quad (b)$$

where $K_2$ is a phase selector relay constant and;

$V_{P1M}$ is the positive sequence component of the pre-faulted transmission line voltage related to the particular phase of the $V_{POL1}$ signal;

$$V_{OP2} = K_8[(I_P-I_O)Z_{R1}+K_OI_OZ_{RO}-V_{PN}] \quad (c)$$

where $Z_{RO}$ is the replica zero impedance of of transmission line;

$K_8$ is a distance measuring constant relay constant;

$K_O$, $I_P$, $I_O$, $Z_{R1}$, and $Z_{RO}$ are as described for expression (a);

$$V_{POL2} = K_6 I_{P2} X_R - K_7 V_{P2} \quad (d)$$

where $K_6$ and $K_7$ are distance measuring relay constants;

$X_R$ is the replica negative sequence reactance of the transmission line;

$I_{P2}$ is the negative sequence component of the current flowing in the transmission line related to the particular phase of the $V_{POL2}$ signal, and;

$V_{P2}$ is the negative sequence component of the voltage existing in the transmission line related to the particular phase of the $V_{POL2}$ signal.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIG. 1 is a one-line representation of a transmission line for a three (3) phase AC power system showing the location of the relays of the present invention relative to zones of the transmission line which are desired to be protected.

FIG. 2 is a block diagram of one embodiment of the present invention.

FIG. 3 is a characteristic diagram of a prior art impedance-type phase selector relay.

FIG. 4 is a characteristic diagram of a prior art phase to ground connected Mho-type relay.

FIG. 5 is a characteristic diagram of a phase-to-phase connected phase Mho-type relay.

FIG. 6 is a characteristic diagram of the phase selector relay of the present invention.

DETAILED DESCRIPTION OF THE PREFERRED EMBODIMENT

Figure 7:
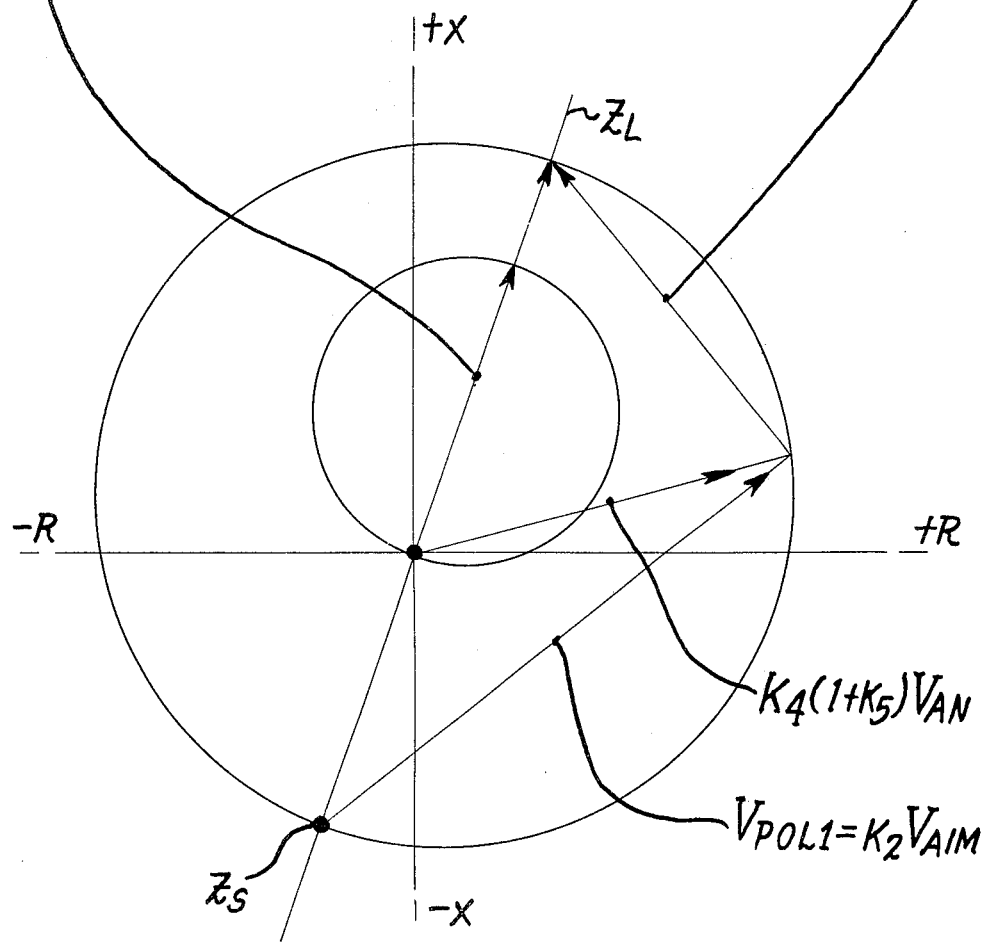
FIG. 7 is a characteristic diagram of the phase selector relay of the present invention showing the various components of $V_{OP1}$ and $V_{POL1}$ signals.

FIG. 1 is a one-line representation of a three (3) phase transmission line 12 shown as interconnecting four power substations A, B, C and D. FIG. 1 further shows four zones 1, 2, 3 and 4 associated with the transmission line 12 desired to be protected by the present invention. Zone 1 is shown as a portion of the transmission line 12 between substations A and B. Zone 2 is shown as portions of the transmission line 12 between substation A and substations B and C. Zone 3 is shown as portions of the transmission line between substation A and substations B, C and D. Zone 4 is shown as the complete transmission system 12 interconnecting all the substations A, B, C and D. As will be discussed hereinafter, the parameters and the operating characteristics of the phase selector relay of the present invention detect and respond to faults within the desired zone 4, whereas, the parameters and operating characteristics of the distance measuring relay of the present invention selectively detect and respond to faults within the desired zones 1, 2 and 3. The phase selector and distance measuring relays of the present invention are located at substation A and as will be described are coupled to the transmission line 12 via devices 11 . . . 24. The relays of the present invention have a circuit arrangement 10 shown in FIG. 2.

The circuit arrangement 10 of FIG. 2 is shown as being coupled to receive a plurality of source signals mainly comprised of $I_A$, $I_B$, $I_C$, $3I_O$, $V_{AN}$, $V_{BN}$ and $V_{CN}$ which are respectively representative of the current and voltage conditions within the three phase transmission line 12. The circuitry of FIG. 2 responds to the plurality of source signals to develop quantities having a phasor representation, which in turn, are representative of normal and abnormal conditions existing within the transmission line 12.

Table 1 lists the received source signals and the phasor quantities shown in FIG. 1 and also gives a general definition for each of the listed signals and quantities:

TABLE 1

| Quantities | General Definition |
|---|---|
| $I_A$, $I_B$ and $I_C$ | current signals respectively representative of the current flowing within phase A, B, and C of the transmission line 12. |
| $Z_{R1}$ | replica positive sequence impedance of the transmission line 12. |
| $Z_{RO}$ | replica positive sequence impedance of the transmission line, but with the phase angle of the zero-sequence impedance of the transmission line 12. |
| $X_R$ | replica negative sequence reactance of the transmission line 12. |
| $V_{AN}$, $V_{BN}$, $V_{CN}$ | voltages respectively representative of the voltages between phases A, B, and C to the neutral (N) of the transmission line 12. |
| $-V_O$ | a reference signal applied to networks 28, 30 and 32 representative to a value equal and opposite to the zero sequence component of the phase-to-neutral voltages of the three phase transmission line 12. |
| $I_O$ | current signal representative of the zero-sequence current flowing within the three (3) phase transmission line 12. |
| $V_{A1}$, $V_{B1}$ and $V_{C1}$ | voltages representative of the positive sequence component of the phase-to-neutral voltage of phases A, B, and C, respectively, of the three (3) phase transmission line 12. |
| $V_{A1M}$, $V_{B1M}$ and $V_{C1M}$ | voltages representative of the pre-fault positive sequence component of the phase-to-neutral voltage of phases A, B, and C, respectively, of the three (3) phase transmission line 12. |
| $V_{OP1}$ | operating signal of the phase selector relay of the present invention. |
| $V_{POL1}$ | polarizing signal of the phase selector relay of the present invention. |
| $V_M$ | a signal representative of the occurrence of either signal $V_{OP1(A)}$, $V_{OP1(B)}$, or $V_{OP1(C)}$. |
| $V_{MT}$ | a control signal representative of the occurrence of the signal $V_M$ for a predetermined time duration. |
| $V_{OP2}$ | operating signal of the distance measuring relay of the present invention. |
| $V_{POL2}$ | polarizing signal of the distance measuring relay of the present invention. |
| $K_O$ | zero-sequence line-impedance compensating factor substantially equal to the amplitude of the quantity $Z_{LO}/Z_{L1}$, where $Z_{LO}$ is equal to the zero sequence line impedance and $Z_{L1}$ is equal to the positive sequence line impedance. |
| $K_1$ | phase selector relay design constant having a typical value of 0.33. |
| $K_2$ and $K_4$ | phase selector relay design constants having scaling factors which, in part, implement the principles of this invention, such as providing interface capability between various electronic elements of FIG. 2. |
| $K_3$ | phase selector relay design constant having a typical value of 0.33. |
| $K_6$ and $K_8$ | distance measuring relay design constants having scaling factors which, in part, implement the principles of this invention, such as providing interface compatibility between various electronic elements of FIG. 2. |
| $K_5$ | phase selector relay design constant having a typical value of 0.33. |
| $K_7$ | distance measuring relay design constant having a value between 0 and $K_6$. |

FIG. 2 also shows phasor quantities not listed nor generally described in Table 1, but which are to be described hereinafter with regard to their applicable relationship to the present invention.

The circuit arrangement 10 shown in FIG. 2 is comprised of a plurality of elements. Table 2 lists the elements along with their reference numbers and states that the elements are either conventional or where applicable references the U.S. Patent or U.S. Patent application which describes the circuit performance of that element. All referenced U.S. Patents and U.S. Patent applications are assigned to the same assignee of the present invention. All referenced U.S. Patents and U.S. Patent applications of Table 2 are herein incorporated by reference.

TABLE 2

| | |
|---|---|
| Current transformers 13, 15, 17 | conventional type |
| Transactors 11, 14, 16 and 18 | conventional type |
| Voltage potential transformers 20, 22 and 24 | conventional type |
| Negative sequence networks 28 and 32, and positive sequence network 30 | U.S. Pat. Application S.N. 297,542 Hodges, filed August 31, 1981, issued as U.S. Pat. No. 4,342,062. |
| Scalers 34 $\left(\dfrac{K_O}{3}\right)$, 36 ($K_6 X_R$) | conventional type |
| 38 ($K_7$), 40 ($K_3$), 41 (1 + $K_5$), 42 ($K_2$) 45 ($K_4$), and 80 ($K_1$) | |
| Memory circuit 44 | U.S. Pat. No. 4,161,011 |
| Monitor control 46 | conventional reed type relay having at least one energizing coil and three normally opened contacts which are activated and closed by the energizing coil. |
| Summing amplifiers (SUM), 48, 60, and 82 | conventional type |
| Differential amplifiers (DIFF) 52, 54 and 56 | conventional type |
| Amplifier (AMP) 58 | conventional type |
| AND circuits 61, 65 and 66 | conventional type |
| OR circuit 68 | conventional type |
| Timers 63, 67 and 70 | conventional type |
| Inverter 86 | conventional type |

As will be discussed, the timers 63, 67 and 70 each have a predetermined constant each of which contributes to an overall predetermined response for circuit arrangement 10. Furthermore, where necessary, the specific function of the elements given in Table 1 are discussed with regard to their particular applicability to the present invention.

FIG. 2 shows current transformers 13, 15 and 17, and 24, respectively coupled to the phases A, B, and C of the transmission line 12. Fig. 2 further shows one end of each of the current transformers 13, 15 and 17 coupled to one end of a primary winding of transactor 11 and the other end of the current transformers 13, 15 and 17 respectively coupled to one end of a primary winding of each transactor 14, 16, and 18. The current transformers 13, 15 and 17 respectively couple to transactors 14, 16, and 18 signals $I_A$, $I_B$ and $I_C$ respectively representative of the current flowing within phases A, B, and C of the transmission line 12. Each of the other ends of the primary winding of each transactor 14, 16 and 18 is connected to the other end of transactor 11 so as to develop the signal $3I_O$.

As shown in FIG. 2, one side of each of the secondary windings of transactors 11, 14, 16 and 18 is coupled to the neutral (N) of the transmission line 12. The turns ratio of transactors 14, 16 and 18 is selected so that the signal $I_A$, $I_B$, and $I_C$, respectively, are multiplied by a factor substantially equal to the $Z_{R1}$ quantity so as to develop output signals from transactors 14, 16 and 18 which are representative of the quantities $I_A Z_{R1}$, $I_B Z_{R1}$, and $I_C Z_{R1}$ respectively. The quantities $I_A Z_{R1}$, $I_B Z_{R1}$, and $I_C Z_{R1}$ are routed to the negative sequence network 28 and the summing amplifier 82. The signal $I_A Z_{R1}$ is also routed to the summing amplifier (SUM) 48.

The turns ratio of the transactor 11 is selected so that the signal $3I_O$ is multiplied by a factor substantially equal to $Z_{RO}$ so as to develop an output signal representative of the quantity $3I_O Z_{RO}$. The quantity $3I_O Z_{RO}$ is routed to the scaler 34

$$\left(\frac{K_O}{3}\right).$$

As further shown in FIG. 2, one side of each of primary windings of potential transformers 20, 22, and 24 is coupled to the neutral (N) of the transmission line 12. The potential transformers 20, 22, and 24 respectively develop the quantities $V_{AN}$, $V_{BN}$ and $V_{CN}$ which are each routed to the positive sequence network 30 and are also each routed to the negative sequence network 32. The positive sequence network 30, the negative sequence network 32 and the previously mentioned negative sequence network 28 are each supplied with the reference signal $-V_O$.

The current transformers 13, 15 and 17, the transactors 11, 14, 16 and 18, and the potential transformers 20, 22 and 24 provide the desired coupled source signals for the phase selector relay and the distance measuring relay of the present invention. The circuit arrangement 10 of FIG. 2 comprises the elements desired for both the phase selector relay and the distance measuring relay. If desired, the circuit arrangement of FIG. 2 may be regrouped so as to separately show the phase selector relay, the circuit distance measuring relay, and the control means for interconnecting the phase selector relay to the distance measuring relay. The elements related to the phase selector relay, the distance measuring relay and the interconnecting control means are respectively listed in the following Tables 3, 4, and 5 and are of the types previously described with regard to Table 2.

TABLE 3—Phase Selector Relay

Elements 30, 40, 41, 42, 44, 45, 48, 52, 60, 61, 63, 80, 82, and 86.

TABLE 4—Distance Measuring Relay

Elements 28, 32, 34, 36, 38, 48, 52, 54, 58, 65, 67, 80, 82, and 86.

TABLE 5—Interconnecting Control Means

Elements 46, 66, 68 and 70.

Further, with regard to FIG. 2, the circuit arrangement 10 depicts the block diagram for developing the signals $V_{OP1}$, $V_{POL1}$, $V_{OP2}$ and $V_{POL2}$ related to Phase A of the transmission line 12. The hereinafter description describes the development of the signals related to phase A of the transmission line; however, those signals are also developed for phase B and C of transmission line 12. The hereinafter description may be related to the phase B and C quantities by replacing the A subscript related to phase A with either a B or C subscript for its applicability to phase B or C respectively.

The source signals $3I_O Z_{RO}$, $I_A Z_{R1}$, $I_B Z_{R1}$, $I_C Z_{R1}$ $V_{AN}$, $V_{BN}$, and $V_{CN}$ are further developed by the circuit arrangement 10 to produce the phasor quantities, shown in FIG. 1, as $V_{OP1}$, $V_{POL1}$, $V_{OP2}$ $V_{POL2}$ represented respectively by the following relationships 1, 2, 3 and 4.

$$V_{OP}=K_4[(1+K_5)[(I_A-I_O)Z_{R1}+K_O I_O Z_{RO}-V_{AN}]+K_3 V_{A1M}] \tag{1}$$

$$V_{POL1}=K_2 V_{A1M} \tag{2}$$

$$V_{OP2}=K_8[(I_A-I_O)Z_{R1}+K_O I_O Z_{RO}-V_{AN}] \tag{3}$$

$$V_{POL2}=K_6 I_{A2} X_R - K_7 V_{A2} \tag{4}$$

The signal $V_{OP1}$, represented by equation 1, is the output signal of scaler 45, having a scaling factor of $K_4$. The input to scaler 45 is the output of summing amplifier 60 which is equal to the quantity having the following relationship;

$$(1+K_5)[(I_A-I_O)Z_{R1}+K_O I_O Z_{RO}-V_{AN}]+K_3 V_{A1M} \tag{5}$$

A comparison between equations 1 and 5 reveals the scaler 45 performs a scaling function represented by the quantity $K_4$. The general definition of $K_O$, $K_3$ and $K_4$ has been previously given in Table 1.

The signal represented by equation (5) is developed by summing amplifier 60. Summing amplifier 60 develops the quantity represented by equation (5) by adding its second input quantity $K_3 V_{A1M}$ to its first input quantity $(1+K_5)[(I_A-I_O) Z_{R1}+K_O I_O Z_{RO}-V_{AN}]$. The signal $K_3 V_{A1M}$ is the output signal developed by the scaler 40 ($K_3$) having a scaling quantity of $K_3$. The input to scaler 40 is the signal $V_{A1M}$ which is developed by a cascaded arrangement of the positive sequence network 30 and the memory circuit 44. The first input quantity to summing amplifier 60 is the output of scaler 41 $(1+K_5)$ having a scaling quantity of $(1+K_5)$.

The input quantity to scaler 41 is the output of differential amplifier 52. Differential amplifier 52 develps an output signal by substracting its second input quantity $V_{AN}$ from its first input quantity $(I_A-I_O) Z_{R1}+K_O Z_{RO}$. The first input quantity of differential amplifier 52 is developed by summing amplifier 48 which sums or adds together its three input quantities, (1) $K_O I_O Z_{RO}$, (2) $-I_O Z_{R1}$, and (3) $I_A Z_{R1}$. The first input quantity $K_O I_O Z_{RO}$ is the input signal developed by Scaler 34

$$\left(\frac{K_O}{3}\right)$$

having a scaler factor of $K_O/3$ and having an input signal of $3I_O Z_{RO}$. The first input quantity $I_A Z_{R1}$, is the previously discussed output signal of transactor 14. The second input quantity $-I_O Z_{R1}$ is the output inverter 86.

The input quantity to inverter 86 is the quantity $I_OZ_{R1}$ which is developed by scaler 80 ($K_1$) having a scaling factor $K_1$ and input quantity of $3I_OZ_{R1}$. The quantity $3I_OZ_{R1}$ is developed by summing amplifier 82 which sums or adds together its three input quantities, (1) $I_CZ_{R1}$, (2) $I_BZ_{R1}$, and (3) $I_AZ_{R1}$ which are respectively developed by the previously discussed transactors 18, 16 and 14.

The signal $V_{POL1}$, represented by equation (2) has as one of its components the signal $V_{A1M}$. The signal $V_{A1M}$ is routed to a scaler 42 having a scaling factor of $K_2$ so as to develop an output signal $K_2V_{A1M}$ which is $V_{POL1}$.

The signal $V_{OP2}$, represented by equation (3), is the output signal of amplifier 58. The input to amplifier 58 is the output of differential amplifier 52 which is the quantity;

$$(I_A - I_O)Z_{R1} + K_OI_OZ_{RO} - V_{AN} \tag{6}$$

A comparison between equations 3 and 6 reveals the amplifier 58 performs an amplifying function represented by the quantity $K_8$ which has a typical value as given in Table 1.

The signal represented by equation (6) is developed by differential amplifier 52 having as its positive input the output of summing amplifier 48 from which is subtracted the quantity $V_{AN}$ present at the negative or second input of differential amplifier 52. The output of summing amplifier 48 is the quantity $(I_A - I_O)Z_{R1} + K_OI_OZ_{RO}$. The quantity $K_OI_OZ_{RO}$ is the output signal of the previously discussed Scaler 34.

The signal $V_{POL2}$, represented by equation (4) is the output of differential amplifier 54. Differential amplifier 54 has as its positive input the quantity $K_6I_{A2}X_R$ and as its negative input the quantity $K_7V_{A2}$. The quantity $K_6I_{A2}X_R$ is the output of the scaler 36 ($K_6X_R$) having as its input the signal $I_{A2}Z_{R1}$ and a scaling factor selected so that the quantity $I_{A2}Z_{R1}$ is transformed to the desired quantity $K_6I_{A2}X_R$. The signal $I_{A2}Z_{R1}$ is developed by the negative sequence network 28. The signal $K_7V_{A2}$ is the output of the scaler 38 ($K_7$) having as its input the signal $V_{A2}$ and a scaling factor selected for the constant $K_7$. The signal $V_{A2}$ is developed by the negative sequence network 32.

It should now be appreciated that circuit arrangement 10 develops the signal $V_{OP1}$, $V_{POL1}$, $V_{OP2}$ and $V_{POL2}$ respectively represented by equations 1, 2, 3 and 4. The signal $V_{OP1}$ and $V_{POL1}$, respectively represent operating and polarizing signals for a phase selector relay of this invention, whereas, the signals $V_{OP2}$ and $V_{POL2}$ respectively represent operating and polarizing signals for a distance measuring relay of this invention. These signals $V_{OP1}$, $V_{POL1}$, $V_{OP2}$ and $V_{POL2}$ represent improvements over the prior art. In order that the improvement may be fully appreciated, reference is first made to prior art phase selector devices having typical operating characteristics as shown in FIGS. 3 and 4.

FIG. 3 is representative of the operating characteristics of an impedance-type phase selector relay coupled between a particular phase, such as phase A, and the neutral (N) both of transmission line 12. The impedance-type phase selector of FIG. 3 typically has two characteristic modes of operation, (1) a steady-state characteristic, that is the characteristic present during the non-occurrence or absence of a fault condition within the transmission line 12, and (2) a variable characteristic, that is, the operating characteristic initiated by the presence of a fault condition within the transmission line 12. The steady-state characteristic is represented in FIG. 3 by a central circle, whereas, the variable characteristic is represented by an outer circle having a radius relatively larger than that of the central circle. Both of the central and outer circles have as their origin the center on the R-X axis of FIG. 3. FIG. 3 shows the portions of the steady-state and variable characteristic circles located in upper or positive domain of the impedance X as being labeled "Forward Reach", and conversely, the portions of the steady-state and variable characteristic circles located in lower or negative domain of the impedance X as being labeled "Reverse Reach". Further, FIG. 3 shows a line $Z_L$ which is meant to represent the impedance of the transmission line 12 having increasing and decreasing values represented by X and R coordinates of FIG. 3. It should be noted that a quantity $Z_S$, representative of the source impedance of the transmission line 12, is located along the $Z_L$ line and is encompassed by the central circle representative of the steady-state operational characteristic of the relay of FIG. 3.

Further, as shown in FIG. 3 with a cross-hatched representation, are five types of faults having a fault resistance $R_F$, three of which are desired to be detected by a phase A-to-neutral (N) phase selector relay, and two of which are not desired to be detected by the phase A-to-neutral (N) connected phase selector. The fault resistance $R_F$ may occur anywhere within zone 4 of the transmission line 12 shown in FIG. 1. The three $R_F$ faults, shown in FIG. 3, which are desired to be detected are, (1) an A-G Fault which represents a phase A-to-ground fault, (2) an A-B Fault which represents a phase A-to-phase B fault, and (3) a C-A Fault which represents a phase C-to-phase A fault. Conversely, the two $R_F$ faults which are not desired to be detected are, (1) C-G Fault which represents a phase C-to-ground fault, and (2) a B-G Fault which represents a phase B-to-ground fault.

From FIG. 3, it should be noted that the Faults C-G and B-G are located partially within the Reverse Reach domain of phase selector A relay. If the reverse reach of the phase selector A relay of FIG. 3 is substantially reduced or eliminated the reaction of the phase selector A relay of FIG. 3 to the undesirable detection of Faults (C-G and B-G) is correspondingly improved or eliminated. However, it should be noted from FIG. 3, that the desired detection of the $R_F$ (A-B) Fault is also located within a portion of the Reverse Reach domain of phase selector A relay and a reduction of the Reverse Reach correspondingly may reduce the ability of the phase selector A relay to correctly react to the A-B type fault. Another type of phase selector relay having reach limitation is shown in FIG. 4.

FIG. 4 shows such the operating characteristic of a prior art phase to ground connected Mho-type phase selector relay using sound-phase or cross-polarization type compensation. FIG. 4 shows a typical operating characteristic of Mho-type relay coupled between phase A-neutral of the transmission line 12 cross-polarized by a voltage obtained from phases B-C. The Forward Reach and the Reverse Reach, both shown in FIG. 4, are similar to those which have been described for FIG. 3.

From FIG. 4, four observations may be made, (1) the Mho type relay detects the complete region of the A-G Fault, (2) the Reverse Reach of the Mho type relay has been substantially reduced relative to FIG. 3, (3) the reduction of the Reverse Reach results in improved phase selection since the relay, as manifested by its variable characteristic represented by the outer circle of FIG. 4, does not respond or operate for $R_F$ Fault (B-G) and (C-G), and (4) the reduction of Reverse Reach also reduces the ability of the phase selector A relay of FIG. 4 to detect phase A-to-B and C-to-A type faults as shown by portions of the $R_F$ Faults (C-A) and (A-B) being located outside of the circles (central and outer) of FIG. 4.

The overall characteristics of systems employing phase selector relays having typical characteristics of those shown in both FIGS. 3 and 4 for the phase A-to-neutral coupled phase selector relay, may be improved by the addition of two phase selector relays which are respectively coupled between phases A-B and phases C-A. In addition to the added cost of the additional phase-phase relays, the phase-to-phase coupled phase selector relays have a major disadvantage in that these relays have a tendency to erroneously operate for close-in phase-to-ground faults. For example, a phase C-to-ground fault located close-in or very near to the location of the relay at substation A, may be erroneously detected by either the phase A-B coupled relay or by the phase selector C-A relay. The effect of such erroneous interpretation is a three-phase fault response may occur for a single-phase fault. This erroneous interpretation of the phase-to-phase coupled phase selector relays is best described with reference to FIG. 5.

FIG. 5 shows the impedance as "seen" by a phase-phase connected Mho type relay, i.e., a phase C-A connected relay. The relay characteristic of FIG. 5, represented by the circle of FIG. 4, while responding correctly to a $R_F$ (C-A) type fault also touches and may typically and erroneously respond to the impedances manifested by the occurrences of a $R_f$(C-G) fault.

A further disadvantage of the impedance or cross-polarized Mho relays of FIGS. 3 and 4 used as a phase selector relay is the inability to supply these relays with "residual current $(I_O)$" compensation. By residual current $(I_O)$ it is meant to represent the current that typically flows in the three (3) phase transmission line 12. If the relays of FIGS. 3 and 4 are supplied with the residual current $I_O$ compensation it may cause two or more phase selector relays to energize or pick up in response to a single phase-to-ground fault. This erroneous reaction is primarily caused by the residual current $I_O$ used for compensation being typically of such a magnitude so as to cause the relay operating signal $V_{OP1}$ to shift inside the 90 degree operation area with respect to the polarizing $V_{POL1}$. The 90 degree operational area, $V_{POL1}$ and $V_{OP1}$ signals are to be further discussed with regard to the present invention.

The present invention provides, in part, a phase selector relay which does not have the limitations and disadvantages of the prior art phase selector relays. In general, the present invention has the advantages of (1) the residual current compensation, (2) a phase-to-ground coupled phase selector relay for each particular phase which does not respond to or is not affected by the occurrences of phase-to-ground faults related to the other phases, and (3) the phase-to-ground coupled relay of each particular phase does not respond to or is not affected by phase-to-ground faults related to the other phases. The operating characteristics of the phase selector relay of the present invention related to $R_f$ faults that may occur within zone 4 of FIG. 1, is shown in FIG. 6.

With regard to FIG. 6, the following three observations should be noted relative to the previously discussed FIGS. 3, 4, and 5, (1) the inner circle of FIG. 6, representing the steady-state operating characteristic of the relay, encompasses the impedance manifested by a typical $R_f$(A-G) Fault but does not include or touch the impedances manifested by $R_f$(A-B) and $R_f$(C-A) type faults, (2) the outer circle of FIG. 6, representing the variable impedance characteristic of the relay, encompasses the impedances manifested by a $R_f$(A-B) and $R_f$(C-A) type faults, and (3) the undesired detectable $R_f$ Faults (C-G) and (B-G) discussed with regard to FIG. 3 are shown outside the domain of the steady state and variable operating characteristics. The desired variable operating characteristics of the phase selector relay of the present invention is primarily provided by the selection of relay constants $K_O$-$K_8$. The elimination of the response to the $R_f$ Faults C-G and B-G, relative to a phase A-to-neutral coupled phase selector relay of the present invention is primarily realized by providing the phase selector relay of the present invention with pre-fault positive-sequence voltage for polarizing the relay.

The phase selector relay of the present invention preserves the advantage of the cross-polarized Mho relay, with respect to no operation for phase to ground faults ($R_f$(B-G) and (C-G) faults) in the other phase as is seen in FIG. 6. The Forward Reach limitations of the cross-polarized Mho relay, with respect to the detection of phase to phase faults, are overcome by the addition of the component $K_3V_{A1M}$ in the operating signal $V_{OP1}$ which results in an increase of the Forward Reach of the variable Mho characteristics as shown also in FIG. 6. The operating characteristic of the phase selector of the present invention correctly responding to the $R_f$ fault shown in FIG. 6 is shown most clearly in FIG. 7. FIG. 7 is interrelated to FIG. 6 and FIG. 2 in that, (1) the steady state characteristic (central circle) and variable operating characteristics (outer circle) of FIG. 6 are shown in FIG. 7, and (2) the components of the $V_{OP1}$ and $V_{POL1}$ described with regard to FIG. 2 are also shown in FIG. 7.

The overall desired operating characteristics of the phase selector relay of the present invention is primarily manifested by improved operating ($V_{OP1}$) and polarizing ($V_{POL1}$) signals having an accurate out-of-phase relationship in response to the normal conditions existing in zone 4 of the transmission line 12 and also an accurate in-phase relationship in response to abnormal conditions existing in zone 4 of the transmission line 12. The phase selector relay response to these accurate in-phase and out-of-phase relationships is best described with reference to FIG. 2, in particular, by referring to AND circuit 61 and TIMER 63 both of FIG. 2.

The AND circuit 61 has inputs $V_{OP1}$ and $V_{POL1}$. The AND circuit 61 develops an output signal which activates and starts TIMER 63 when both of the inputs $V_{OP1}$ and $V_{POL1}$ are present or in phase coincidence. The presence of an output signal from AND circuit 61 for a predetermined duration, having a typical value of 4.16 msec, causes the TIMER 63 to time-out or expire, which, in turn causes TIMER 63 to generate an output function 72 (TRIP) $A_1$. The function 72 (TRIP) $A_1$ is routed to and activates a single-phase circuit breaker (not shown). The activation of the single-phase circuit breaker causes one-phase, in this particular case phase A, to be decoupled from the remainder of the transmission line 12.

The typical time duration of 4.16 msec for TIMER 63 is selected relative to the frequency of the AC power system coupled to the transmission line 12. For example, for an AC power system having a frequency of 60 hertz, its time duration for the occurrence of 360° of its frequency is 1/60 Hz which is equal to approximately 16.6 msec. The selected 4.16 msec duration therefore represents one-quarter of 16.6 msec. or a 90° phase relationship between $V_{OP1}$ and $V_{POL1}$ relative to a 60 Hz AC power system. This 90 degree phase relationship is typically referred to as the previously mentioned 90 degree operation area of the phase selector relay.

It should now be appreciated that this present invention provides a phase selector relay having an operating signal $V_{OP1}$ and polarizing signal $V_{POL1}$ that correctly responds to the normal and abnormal conditions within a protected zone 4 of the transmission line 12.

Figure 8:
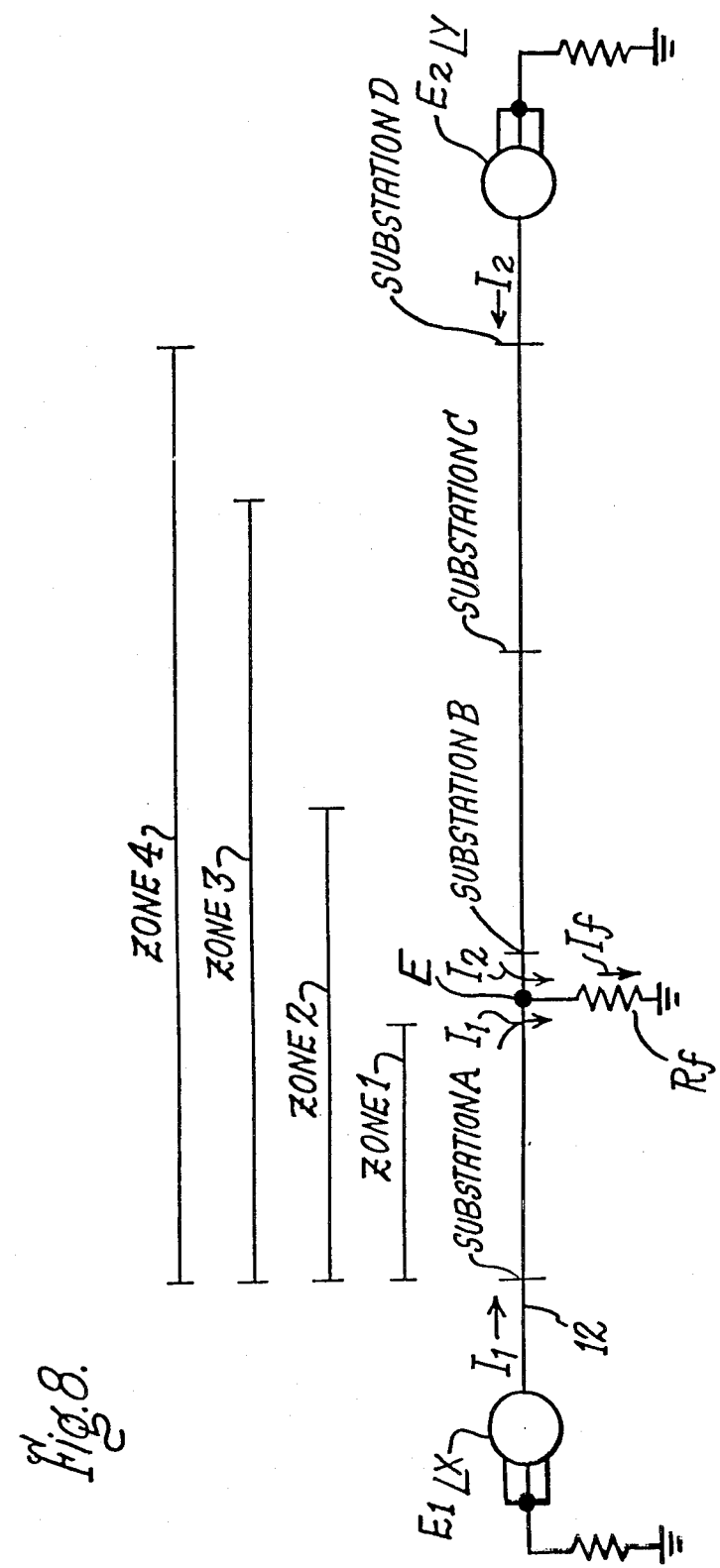
FIG. 8 is a one-line representation showing a fault located near the boundary of zones 1 and 2 of the transmission line.

As previously discussed, this invention also includes a further embodiment, that being a distance measuring relay. It is desired that distance measuring relays correctly operate within desired zones, such as zones 1, 2 and 3 shown in FIg. 1, and more clearly shown in FIG. 8. FIG. 8 shows the zones 1, 2, and 3, related to the transmission line 12, as interconnecting two source voltages $E_1$ and $E_2$. The source voltage $E_1$ has a phase angle X, and the source voltage $E_2$ has a phase angle Y. The current related to source $E_1$ is shown as $I_1$, and similarly, the current related to source $E_2$ is shown as $I_2$. The distance measuring relay, as previously discussed, is located at substation A. A fault resistance $R_f$ is shown in a portion of zone 2 having a location E which borders a terminal portion of zone 1. The current related to the fault resistance $R_f$ is shown as $I_f$ which is comprised of components of the currents $I_1$ and $I_2$. A typical characteristic of the fault resistance $R_f$ "seen" by a distance relay located at substation A for a phase-to-ground fault occurring at a location E is shown in FIG. 9.

Figure 9:
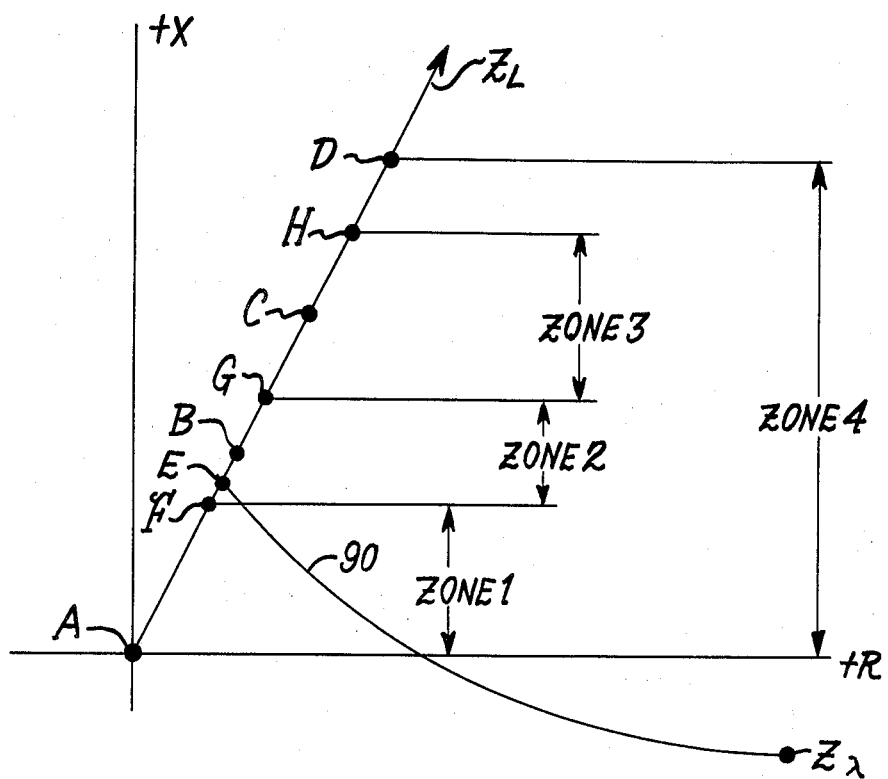
FIG. 9 shows the typical prior art characteristic of fault of FIG. 8.

FIG. 9 shows the impedance of the line $Z_L$ as being a substantially linear quantity having an origin located at A which is the substation A of FIG. 8. FIG. 9 shows the $Z_L$ quantity relative to the zones 1, 2, 3, and 4. The $Z_L$ quantity increases in a substantially linear manner from its lower values at zone 1 to its upper values at the upper portion of zone 4. Zones 1, 2, 3, and 4 are shown in FIG. 9 with respect to the origin A and horizontal lines at F, G, H and D. Zones 1, 2, 3 and 4 are shoen respectively as extending between A-F, A-G, A-H and A-D. The point D indicating the upper limit of zone 4 is also representative of the $Z_L$ impedance of substation D as "seen" by the distance relay located at substation A. Similarly, the $Z_L$ impedance of substations B and C "seen" by the distance relay located at substation A are shown on the $Z_L$ plot of FIG. 9 as B and C respectively. The impedance $Z_L$ at F indicating the desired upper limit of zone 1 has a typical value of 0.8 of the impedance value $Z_L$ of substation B. It is desired that $Z_L$ values greater than this 0.8 value be detected and responded to as a zone 2 quantity. Correspondingly, it is desired that the $R_f$ fault of location E, shown in FIG. 9 as interposed between locations F (Zone 1) and B (Substation B), be detected as a zone 2 quantity. However, FIG. 9 further shows the $R_f$ fault at location E as having an impedance 90 that is manifested as a circle passing through E having an impedance $Z\lambda$, where $Z\lambda$ is the prefault load impedance ($Z\lambda = VA/IA$ pre-fault) at point A. FIG. 9 still further above shows this $R_f$ fault 90 as being located in the domains of zones 1 and 2. The circle segment 90 representative of the fault resistance $R_f$ is caused by a mismatch between the phase angles of the currents $I_1$ and $I_2$ which comprise the fault current $I_f$. The mismatch between phase angles of the currents $I_1$ and $I_2$, in turn, is primarily caused by the mismatch between the phase angles of X and Y of source voltage $E_1$ and $E_2$ respectively.

The $R_f$ circle segment 90 is shown in FIG. 9 as initiating or starting at the point E located in zone 2 and then decaying into zone 1. If the $R_f$ fault desired to be detected as a zone 2 fault is detected as a zone 1 fault it would be a detection error causing an erroneous response contributable to the distance measuring relay. The distance measuring relay of the present invention having an operating characteristic as shown in FIG. 10 provides the means to discriminate against such an erroneous response.

Figure 10:
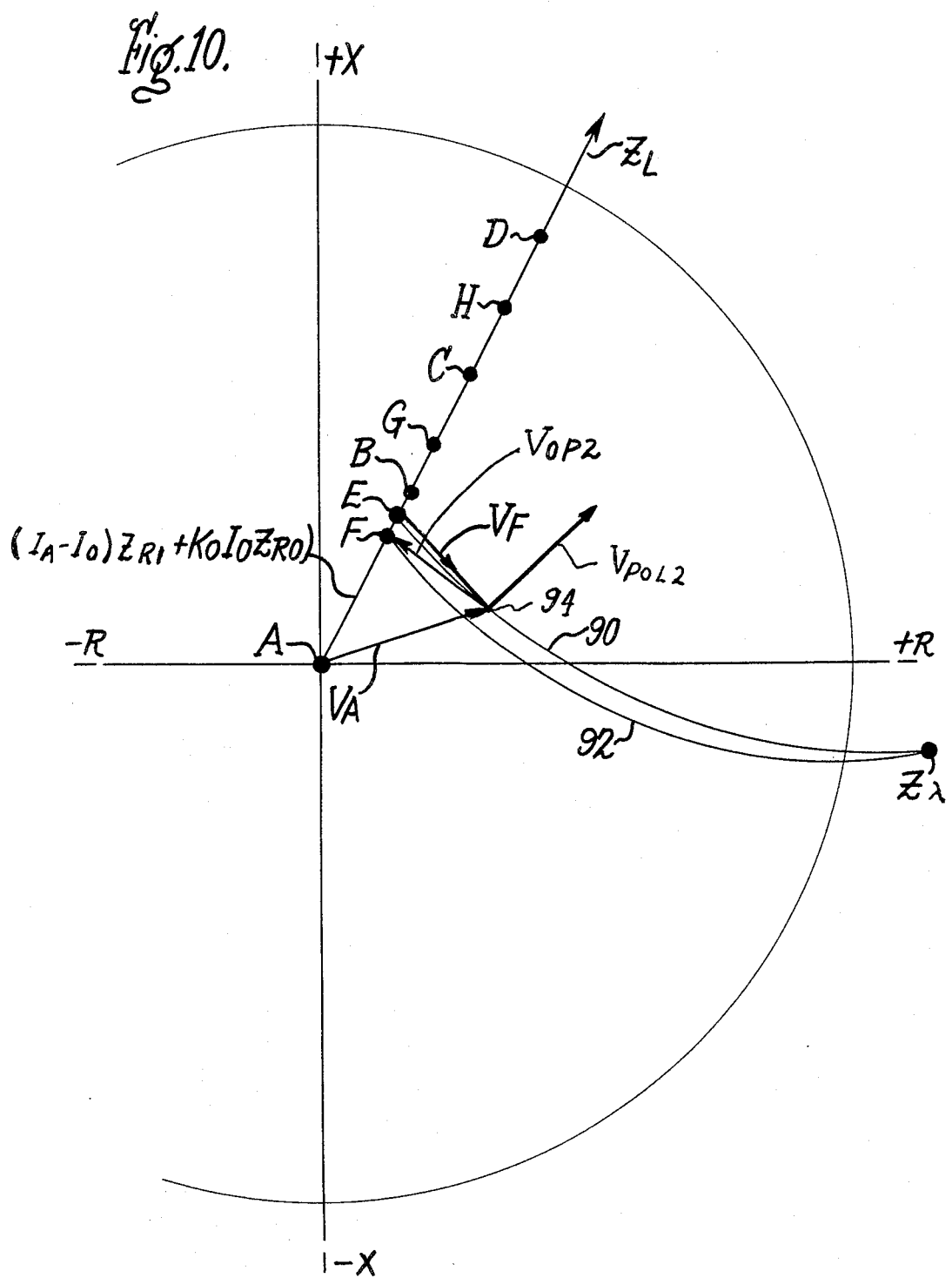
FIG. 10 is a characteristic diagram of the distance measuring relay of the present invention related to the fault of FIGS. 8 and 9.

FIG. 10, where applicable, uses the same nomenclature as that of FIG. 9. FIG. 10 shows the impedance function $Z_L$ relative to points F, E, D, G, C and H, and the circle segment 90 all previously discussed with regard to FIG. 9. FIG. 10 further shows a second circle segment 92 which is the characteristic curve of the distance measuring relay of the present invention. The shape of circle segment 92 closely follows the $R_f$ circle segment 90. The closely following shape of the circle segment 92 relative to the $R_f$ circle segment 90 allows the distance measuring relay to correctly respond to the $R_f$ fault at location E. The desired shape of the characteristic curve 92 is mainly provided by the negative sequence component $I_{A2}$ of the $V_{POL2}$ signal. The correct response is illustrated in FIG. 10 by use of the shown phasor quantities $V_{OP2}$, $V_F$, $V_A$, $V_{POL2}$ and $(I_A - I_O) Z_{R1} + K_O I_O Z_{RO})$ each relative to a point 94 located along the $R_f$ circle segment 90.

From FIG. 10 it should be noted that for a fault at location E the distance measuring relay does not operate since the angle between $V_{OP2}$ and $V_{POL2}$ is more than 90 degrees; however, for a fault at the zone 1 relay reach of point F the $V_F$ quantity will be equal to $V_{OP2}$ therefore, $V_{OP2}$ and $V_{POL2}$ are essentially at 90° regardless of the magnitude of the fault impedance providing the balancing point for relay operation. It follows that for any fault closer than point F, the angle between $V_{POL2}$ and $V_{OP2}$ is smaller than 90° and the distance measuring relay operates. The negative phase sequence current $I_{A2}$ provides the distance measuring relay of the present invention with a polarizing signal $V_{POL2}$ which is essentially 90° out of phase with the fault voltage $R_f I_f$ and with the operating signal $V_{OP2}$, for a fault at the reach point irrespective of the angle between $E_1$ and $E_2$.

In a still further embodiment of the present invention, that being a system utilizing both the phase selector relay and the distance measuring relay, the distance measuring relay is operated under control of the phase selector relay. The operating control elements interconnecting the phase selector and distance measuring relays is shown in FIG. 2, more particularly, in FIG. 2 with regard to elements 46, 66, 68 and 70.

The element 68 of FIG. 2 is an OR circuit having as its first input the output of TIMER 63 that being 72 (TRIP) $A_1$ as its second input TRIP B, and as its third input TRIP C. The signal TRIP B and TRIP C are developed in a manner as previously described for 72 (TRIP) $A_1$ except the TRIP B and TRIP C are respectively related to phases B and C of the transmission line 12. The occurrence of either of the three inputs TRIP A, TRIP B or TRIP C causes OR 68 to generate an output signal $V_M$.

The output signal $V_M$ is routed to AND circuit 66 and to TIMER 70. The application of signal $V_M$ to TIMER 70 starts an internal timer which after expiration causes TIMER 70 to generate an output signal, which, in turn, is routed to a second input of the AND circuit 66 having as its first input the output signal $V_M$.

The presence of both input signals to AND circuit 66 causes AND circuit 66 to generate an output signal $V_{MT}$. The signal $V_{MT}$ is routed to and activates the energizing coil of the MONITOR CONTROL 46, which, in turn causes the three (3) noramlly opened contacts, shown in FIG. 2, to close, which, in turn, activates the distance measuring relay of the present invention.

Although the interconnecting control logic between the phase selector relay and the distance measuring relay has described the use of a monitor control 46 to activate the distance measuring relay it should be recognized that the distance measuring relay may be activated by routing the output signal $V_{MT}$ directly to AND circuit 65 and by using the presence of signal $V_{MT}$ to qualify the AND circuit 65 to be described.

The distance measures relay has a phase comparator network which measuring the phase coincidence between its operating $V_{OP2}$ and polarizing $V_{POL2}$ signal and operates in a manner as that previously discussed for the phase comparator network of phase selector relay. More particularly, the AND circuit 65 and TIMER 67 of the distance measuring relay operates in a manner as described for the AND circuit 61 and TIMER 63, respectively, of the phase selector relay. The AND circuit 65 and TIMER 67 respond to the phase coincidence between $V_{OP2}$ and $V_{POL2}$, whereas, the AND circuit 61 and TIMER 63 respond to the phase coincidence between $V_{OP1}$ and $V_{POL1}$. The TIMER 67 generates an output signal 74 (TRIP A) when the phase coincidence between $V_{OP2}$ and $V_{POL2}$ is equal to or greater than the previously discussed typical value of 4.16 msec. which is also representative of a 90 degree phase coincidence between $V_{OP2}$ and $V_{POL2}$. The typical value of 4.16 msec corresponds to 90° in a 60 Hz system. In a 50 Hz system, the corresponding timer value would be 5.0 msecs.

Although the hereinbefore description for both the phase selector relay and the distance measuring relays of the present invention is related to the response of these relays by phase comparator type circuits operating on the phase coincidence difference between their respective operating and polarizing signals, it should be recognized that these relays may be implemented with other types of comparators. For example, an amplitude comparator type circuit may be implemented to obtain the desired operating characteristics for the phase comparator relay and for the distance measuring relay.

The signals related to an amplitude type comparator are not the same as used in a phase type comparator. The signals for an amplitude type comparator may be termed $V_{AM1}$ and $V_{AM2}$. The signal $V_{AM1}$ may be termed the operate signal of the amplitude comparator and the signal $V_{AM2}$ may be termed the restraint signal of the amplitude comparator. The signal $V_{AM1}$ may be related to either of the previously described operating signals ($V_{OP1}$ or $V_{OP2}$) and to either of the previously described polarizing signals ($V_{POL1}$ or $V_{POL2}$) by the following expression:

$$V_{AM1} = \tfrac{1}{2}(V_{POL} + V_{OP}) \tag{7}$$

Similarly, the signal $V_{AM2}$ may be related to either of the previously described operating signals ($V_{OP1}$ or $V_{OP2}$) and to either of the previously described polarizing signals ($V_{POL1}$ or $V_{POL2}$) by the following expression:

$$V_{AM2} = \tfrac{1}{2}(V_{POL} - V_{OP}) \tag{8}$$

To further correlate the operate signal $V_{AM1}$ and the restraint signal $V_{AM2}$ of an amplitude comparator to the hereinbefore given description, the $V_{AM1}$ and $V_{AM2}$ for the phase selector relay of the present invention may each respectively be expressed as:

$$\text{Operate signal } V_{AM1} = \tfrac{1}{2}(V_{POL1} + V_{OP1}) \tag{9, and;}$$

$$\text{Restraint signal } V_{AM2} = \tfrac{1}{2}(V_{POL1} - V_{OP1}) \tag{10}$$

Similarly, the $V_{AM1}$ and $V_{AM2}$ for the distance measuring relay of the present invention may each respectively be expressed as:

$$\text{Operate signal } V_{AM3} = \tfrac{1}{2}(V_{POL2} + V_{OP2}) \tag{11, and;}$$

$$\text{Restraint signal } V_{AM4} = \tfrac{1}{2}(V_{POL2} - V_{OP2}) \tag{12}$$

Still further, to correlate an amplitude comparator to the hereinbefore given description, reference is made to FIG. 2. For an amplitude comparator for the phase selector relay the AND circuit 61 may be replaced by a differential amplifier similar to differential amplifier 52. The output signal of scaler 45, that being $V_{OP1}$, and the output signal of scaler 42, that being $V_{POL1}$, may then be combined, scaled and substrated, in a similar manner as previously described, so as to develop the two signals given by the expressions (9) and (10). The two developed signals of expressions (9) and (10) may then be routed to the two inputs of the replacement differential amplifier of the amplitude comparator. The replacement differential amplifier may then generate an output signal to its respective TIMER 63 proportional to the difference between the operating and restraint signal of the phase selector relay. The remainder of the operation of the phase selector relay is as previously described.

For an amplitude comparator for the distance measuring relay, the AND circuit 65, the output of amplifier 58 that being $V_{OP2}$, and the output of differential amplifier 54 that being $V_{POL2}$ may be replaced and modified in a manner as described for the amplitude comparator of the phase selector relay. After the desired replacement and modification have been completed the remainder of the operation of the distance measuring relay is as previously described.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What is claimed is:

1. A system comprised of a phase selector relay and a distance measuring relay both for protecting one or more phases of one or more zones of a high voltage A.C. transmission line, said phase selector relay developing a first operating signal $V_{OP1}$ and a first polarizing signal $V_{POL1}$ for each phase of the transmission line and each representative of the current and voltage conditions existing in each of the phases, said distance measuring relay developing a second operating signal $V_{OP2}$ and a second polarizing signal $V_{POL2}$ for each phase of the transmission line and each representative of the current and voltage conditions existing in each of the phases, said protective system further having a first and a second phase angle comparator comprising respectively interconnected first and second AND circuit means and first and second TIMER means, said first AND circuit means being responsive to the phase coincidence between said first operating signal ($V_{OP1}$) and said first polarizing signal ($V_{POL1}$) for developing a first output signal which is routed to and activates said first TIMER means, said first TIMER means generating a first control signal upon the expiration of a first predetermined time duration, said second AND circuit means being responsive to said first control signal and to the phase coincidence between said second operation signal ($V_{OP2}$) and said second polarizing ($V_{POL2}$) signal for developing a second output signal which is routed to and activates the second TIMER means, said second TIMER means generating a second control signal upon the expiration of a second predetermined time duration, each of said first and second control signals being adapted to control circuit breaking means for causing said one or more phases of the one or more zones of the transmission line to be decoupled from the remainder of the transmission line, said protective system further comprising means for developing said $V_{OP1}$, $V_{POL1}$, $V_{OP2}$ and $V_{POL2}$ signals respectively representative of the following relationships:

$$V_{OP1} = K_4\{(1+K_5)[(I_P-I_O)Z_{R1}+K_O I_O Z_{RO}-V_{PN}]+K_3 V_{P1M}\} \quad (a)$$

where the subscript P shown for the current (I) and voltage (V) quantities is either A, B, or C to indicate the particular phase of the transmission line related to the particular phase of the $V_{OP1}$ signal;

$K_3$, $K_4$, and $K_5$ are phase selector relay constants;

$K_O$ is a zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;

$I_O$ is the zero-sequence current flowing within the three (3) phase transmission line;

$Z_{R1}$ is the replica positive sequence impedance of the transmission line;

$Z_{RO}$ is the replica positive sequence impedance of the transmission line, but with the phase angle of the zero-sequence impedance of the transmission line;

$I_P$ is representative of the current flowing in the transmission line related to the particular phase of the $V_{OP1}$ signal;

$V_{P1M}$ is the positive sequence component of a prefaulted transmission line voltage related to the particular phase of the $V_{OP1}$ signal, and;

$V_{PN}$ is the phase-to-neutral voltage of the transmission line related to the particular phase of the $V_{OP1}$ signal;

$$V_{POL1} = K_2 V_{P1M} \quad (b)$$

where $K_2$ is a phase selector relay constant, and;

$V_{P1M}$ is the positive sequence component of the prefaulted transmission line voltage related to the particular phase of the $V_{POL1}$ signal;

$$V_{OP2} = K_8[(I_P-I_O)Z_{R1}+K_O I_O Z_{RO}-V_{PN}] \quad (c)$$

where $K_8$ is a distance measuring relay constant;

$K_O$, $I_P$, $I_O$, $V_{PN}$, $Z_{R1}$ and $Z_{RO}$ are as described for expression (a);

$$V_{POL2} = K_6 I_{P2} X_R - K_7 V_{P2} \quad (d)$$

where $K_6$ and $K_7$ are distance measuring relay constants;

$X_R$ is the replica negative sequence reactance of the transmission line;

$I_{P2}$ is the negative sequence component of the current flowing in the transmission line related to the particular phase of the $V_{POL2}$ signal, and;

$V_{P2}$ is the negative sequence component of the voltage existing in the transmission line related to the particular phase of the $V_{POL2}$ signal.

2. A phase selector relay for protecting one or more phases of one or more zones of a high voltage A.C. transmission line, said phase selector relay developing an operating signal $V_{OP1}$ and a polarizing signal $V_{POL1}$ for each phase of the transmission line and each representative of the current and voltage conditions existing in each phase, said phase selector relay further having a phase angle comparator comprising an AND circuit means and a TIMER means, said AND circuit means being responsive to the phase coincidence between the $V_{OP1}$ and $V_{POL1}$ signals for developing an output signal which is routed to and activates said TIMER means, said TIMER means generating a control signal upon the expiration of a predetermined time duration, said control signal being adapted to control circuit breaking means for causing said one or more phases of the one or more zones of the transmission line to be decoupled from the remainder of the transmission line, said phase selector relay further comprising means for developing said $V_{OP1}$ and $V_{POL1}$ signals respectively representative of the following relationships:

$$V_{OP1} = K_4\{(1+K_5)[(I_P-I_O)Z_{R1}+K_O I_O Z_{RO}-V_{PN}]+K_3 V_{P1M}\} \quad (a)$$

where the subscript P shown for the current (I) and voltage (V) quantities is either A, B, or C to indicate the particular phase of the transmission line related to the particular phase of the $V_{OP1}$ signal;

$K_3$, $K_4$, and $K_5$ are phase selector relay constants;

$K_O$ is a zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;

$I_O$ is the zero-sequence current flowing within the three (3) phase of the transmission line;

$Z_{R1}$ is the replica positive sequence impedance of the transmission line;

$Z_{RO}$ is the replica positive sequence impedance of the transmission line, but with the phase angle of the zero-sequence impedance of the transmission line;

$I_P$ is representative of the current flowing in the transmission line related to the particular phase of the $V_{OP1}$ signal;

$V_{P1M}$ is the positive sequence component of a prefaulted transmission line voltage related to the particular phase of the $V_{OP1}$ signal, and;

$V_{PN}$ is the phase-to-neutral voltage of the transmission line related to the particular phase of the $V_{OP1}$ signal;

$$V_{POL1} = K_2 V_{P1M} \qquad (b)$$

where $K_2$ is a phase selector relay constant, and;

$V_{P1M}$ is the positive sequence component of the prefaulted transmission line voltage related to the particular phase of the $V_{POL1}$ signal.

3. A distance measuring relay for protecting one or more phases of one or more zones of a high voltage A.C. transmission line, said distance measuring relay developing an operating signal $V_{OP2}$ and a polarizing signal $V_{POL2}$ for each phase of the transmission line and each representative of the current and voltage conditions existing in each phase, said distance measuring relay further having a phase angle comparator comprising an AND circuit means and a TIMER means, said AND circuit means being responsive to the phase coincidence between the $V_{OP2}$ and $V_{POL2}$ signals for developing an output signal which is routed to and activates said TIMER means, said TIMER means generating a control signal upon the expiration of a predetermined time duration, said control signal being adapted to control circuit breaking means for causing one or more phases of the one or more zones of the transmission line to be decoupled from the remainder of the transmission line, said distance measuring relay further comprising means for developing said $V_{OP2}$ and $V_{POL2}$ signals respectively representative of the following relationships:

$$V_{OP2} = K_8[(I_P - I_O)Z_{R1} + K_O I_O Z_{RO} - V_{PN}] \qquad (a)$$

where $K_8$ is a distance measuring relay constant;

$K_O$ is a zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;

$I_O$ is the zero-sequence current flowing within the three (3) phase transmission line;

$Z_{R1}$ is the replica positive sequence impedance of the transmission line;

$Z_{RO}$ is the replica positive sequence impedance of the transmission line, but with the phase angle of the zero-sequence impedance of the transmission line;

$I_P$ is representative of the current flowing in the transmission line related to the particular phase of the $V_{OP1}$ signal;

$V_{P1M}$ is the positive sequence component of a prefaulted transmission line voltage related to the particular phase of the $V_{OP1}$ signal, and;

$V_{PN}$ is the phase-to-neutral voltage of the transmission line related to the particular phase of the $V_{OP1}$ signal;

$$V_{POL2} = K_6 I_{P2} X_R - K_7 V_{P2} \qquad (b)$$

where $K_6$ and $K_7$ are distance measuring relay constants;

$X_R$ is the replica negative sequence reactance of the transmission line;

$I_{P2}$ is the negative sequence component of the current flowing in the transmission line related to the particular phase of the $V_{POL2}$ signal, and;

$V_{P2}$ is the negative sequence component of the voltage existing in the transmission line related to the particular phase of the $V_{POL2}$ signal.

4. A system comprising a phase selector relay and a distance measuring relay both for protecting one or more phases of one or more zones of a high voltage transmission line, said phase selector relay developing a first operating signal $V_{AM1}$ and a first restraint signal $V_{AM2}$ for each phase of the transmission line and each representative of the current and voltage conditions existing in each of the phases, said distance measuring relay developing a second operating signal $V_{AM3}$ and a second restraint signal $V_{AM4}$ for each phase of the transmission line and each representative of the current and voltage conditions existing in each of the phases, said protective system further having a first and a second amplitude comparator comprising respectively interconnected first and second differential means and first and second TIMER means, said first differential means being responsive to the difference between said first operating signal $V_{AM1}$ and said first restraint signal $V_{AM2}$ for developing a first output signal which is routed to and activates said first TIMER means, said first TIMER means generating a first control signal upon the expiration of a first predetermined time duration, said second differential means being responsive to said first control signal and to the difference between said second operating signal $V_{AM3}$ and said second restraint signal $V_{AM4}$ for developing a second output signal which is routed to and activates the second TIMER means, said second TIMER means generating a second control signal upon the expiration of a second predetermined time duration, each of said first and second control signals being adapted to control circuit breaking means for causing said one or more phases of the one or more zones of the transmission line to be decoupled from the remainder of the transmission line, said protective system further comprising means for developing said $V_{AM1}$, $V_{AM2}$, $V_{AM3}$ and $V_{AM4}$ signals respectively representative of the following relationships:

$$V_{AM1} = \tfrac{1}{2}(K_2 V_{P1M} + K_4\{(1+K_5)[(I_P-I_O)Z_{R1} + K_O I_O Z_{RO} - V_{PN}] + K_3 V_{P1M}\}) \qquad (a)$$

where the subscript P shown for the current (I) and voltage (V) quantities is either A, B, or C to indicate the particular phase of the transmission line related to the particular phase of the $V_{AM1}$ signal;

$K_2$, $K_3$, $K_4$ and $K_5$ are phase selector relay constants;

$K_O$ is the zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;

$I_O$ is the zero-sequence current flowing within the three (3) phase transmission line;

$Z_{R1}$ is the replica positive sequence impedance of the transmission line;

$Z_{RO}$ is the replica positive sequence impedance of the transmission line, but with the phase angle of the zero sequence impedance of the transmission line;

$I_P$ is representative of the current flowing in the transmission line related to the particular phase of the $V_{AM1}$ signal;

$V_{P1M}$ is the positive sequence component of a prefaulted transmission line voltage related to the particular phase of the $V_{AM1}$ signal; and $V_{PN}$ is the phase-to-neutral voltage of the transmission line related to the particular phase of the $V_{AM1}$ signal;

$$V_{AM2} = \frac{1}{2}(K_2 V_{P1M} - K_4\{(1+K_5)[(I_P-I_O)Z_{RO} + K_O I_O Z_{RO} - V_{PN}] + K_3 V_{P1M}\}) \quad (b)$$

where the subscript P and the quantities $K_2$, $K_3$, $K_4$, $K_5$, $K_O$, $I_O$, $Z_{R1}$, $Z_{RO}$, $I_P$, $V_{P1M}$ and $V_{PN}$ are as given in relationship (a) with the exception that the subscript P is related to the particular phase of the $V_{AM2}$ signal;

$$V_{AM3} = \frac{1}{2}((K_6 I_{P2} X_R = K_7 V_{P2}) + K_8[(I_P-I_O)Z_{R1} + K_O I_O Z_{RO} - V_{PN}]) \quad (c)$$

where $K_6$, $K_7$ and $K_8$ are distance measuring relay constants;
$X_R$ is the replica negative sequence reactance of the transmission line;
the subscript P shown for the current (I) and voltage (V) quantities is either A, B, or C to indicate the particular phase of the transmission line related to the particular phase of the $V_{AM3}$ signal;
$I_{P2}$ is the negative sequence component of the current flowing in the transmission line related to the particular phase of the $V_{AM3}$ signal;
$V_{P2}$ is the negative sequence component of the voltage existing in the transmission line related to the particular phase of the $V_{AM3}$ signal; and,
$K_O$, $I_P$, $I_O$, $V_{PN}$, $Z_{R1}$ and $Z_{RO}$ are as described for relationship (a);

$$V_{AM4} = \frac{1}{2}((K_6 I_{P2} X_R - K_7 V_{P2}) - K_8[(I_P-I_O)Z_{R1} + K_O I_O Z_{RO} - V_{PN}]) \quad (d)$$

where the subscript P and the quantities $K_6$, $K_7$, $K_8$, $X_R$, $I_{P2}$, $V_{P2}$, $K_O$, $I_P$, $I_O$, $V_{PN}$, $Z_{R1}$ and $Z_{RO}$ are as given in expression (c) with the exception that the P subscript is related to the particular phase of the $V_{AM4}$ signal.

5. A phase selector relay for protecting one or more phases of one or more zones of a high voltage transmission line, said phase selector relay developing an operating signal $V_{AM1}$ and a restraint signal $V_{AM2}$ for each phase of the transmission line and each representative of the current and voltage conditions existing in each of the phases, said phase selector relay further having an amplitude comparator comprising a differential means and a TIMER means, said differential means being responsive to the difference between said operating signal $V_{AM1}$ and said restraint signal $V_{AM2}$ for developing a first output signal which is routed to and activates said TIMER means, said TIMER means generating a first control signal upon the expiration of a first predetermined time duration, said first control signal being adapted to control circuit breaking means for causing said one or more phases of the one or more zones of the transmission line to be decoupled from the remainder of the transmission line, said protective system further comprising means for developing said $V_{AM1}$ and $V_{AM2}$ signals respectively representative of the following relationships:

$$V_{AM1} = \frac{1}{2}(K_2 V_{P1M} + K_4\{(1+K_5)[(I_P-I_O)Z_{R1} + K_O I_O Z_{RO} - V_{PN}] + K_3 V_{P1M}\}) \quad (a)$$

where the subscript P shown for the current (I) and voltage (V) quantities is either A, B, or C to indicate the particular phase of the transmission line related to the particular phase of the $V_{AM1}$ signal;
$K_2$, $K_3$, $K_4$ and $K_5$ are phase selector relay constants;
$K_O$ is the zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;
$I_O$ is the zero-sequence current flowing within the three (3) phase transmission line;
$Z_{R1}$ is the replica positive impedance of the transmission line;
$Z_{RO}$ is the replica positive sequence impedance of the transmission line, but with the phase angle of the zero-sequence impedance of the transmission line;
$I_P$ is representative of the current flowing in the transmission line related to the particular phase of the $V_{AM1}$ signal;
$V_{P1M}$ is the positive sequence component of a pre-faulted transmission line voltage related to the particular phase of the $V_{AM1}$ signal; and
$V_{PN}$ is the phase-to-neutral voltage of the transmission line related to the particular phase of the $V_{AM1}$ signal;

$$V_{AM2} = \frac{1}{2}(K_2 V_{P1M} - K_4\{(1+K_5)[(I_P-I_O)Z_{RO} + K_O I_O Z_{RO} - V_{PN}] + K_3 V_{P1M}\}) \quad (b)$$

where the subscript P and the quantities $K_2$, $K_3$, $K_4$, $K_5$, $K_O$, $I_O$, $Z_{R1}$, $Z_{RO}$, $I_P$, $V_{P1M}$ and $V_{PN}$ are as given in relationship (a) with the exception that the subscript P is related to the particular phase of the $V_{AM2}$ signal.

6. A distance measuring relay for protecting one or more phases of one or more zones of a high voltage transmission line, said distance measuring relay developing an operating signal $V_{AM3}$ and a restraint signal $V_{AM4}$ for each phase of the transmission line and each representative of the current and voltage conditions existing in each of the phases, said protective system further having an amplitude comparator comprising a differential means and a TIMER means, said differential means being responsive to the difference between said operating signal $V_{AM3}$ and said restraint signal $V_{AM4}$ for developing a first output signal which is routed to and activates said TIMER means, said TIMER means generating a first control signal upon the expiration of a first predetermined time duration, said first control signal being adapted to control circuit breaking means for causing said one or more phases of the one or more zones of the transmission line to be decoupled from the remainder of the transmission line, said protective system further comprising means for developing said $V_{AM3}$ and $V_{AM4}$ signals respectively representative of the following relationships:

$$V_{AM3} = \frac{1}{2}((K_6 I_{P2} X_R - K_7 V_{P2}) + K_8[(I_P-I_O)Z_{R1} + K_O I_O Z_{RO} - V_{PN}]) \quad (a)$$

where $K_6$, $K_7$ and $K_8$ are distance measuring relay constants;
$X_R$ is the replica negative sequence reactance of the transmission line;
the subscript P shown for the current (I) and voltage (V) quantities is either A, B, or C to indicate the particular phase of the transmission line related to the particular phase of the $V_{AM3}$ signal;

$I_{P2}$ is the negative sequence component of the current flowing in the transmission line related to the particular phase of the $V_{AM3}$ signal;

$V_{P2}$ is the negative sequence component of the voltage existing in the transmission line related to the particular phase of the $V_{AM3}$ signal;

$K_O$ is the zero-sequence line impedance compensation factor substantially equal to the amplitude of the quantity $Z_{LO}/Z_{L1}$, where $Z_{LO}$ is equal to the zero-sequence line impedance and $Z_{L1}$ is equal to the positive-sequence line impedance;

$I_O$ is the zero-sequence current flowing within the three (3) phase transmission line;

$Z_{R1}$ is the replica positive sequence impedance of the transmission line;

$Z_{RO}$ is the replica positive sequence impedance of the transmission line, but with the phase angle of the zero-sequence impedance of the transmission line;

$I_P$ is representative of the current flowing in the transmission line related to the particular phase of the $V_{AM3}$ signal;

$V_{PN}$ is the phase-to-neutral voltage of the transmission line related to the particular phase of the $V_{AM3}$ signal; and, $$V_{AM4} = \tfrac{1}{2}((K_6 I_{P2} X_R - K_7 V_{P2}) - K_8[(I_P - I_O)Z_{R1} + K_O I_O Z_{RO} - V_{PN}]) \qquad (b)$$

where the subscript P and the quantities $K_6$, $K_7$, $K_8$, $X_R$, $I_{P2}$, $V_{P2}$, $K_O$, $I_P$, $I_O$, $V_{PN}$, $Z_{R1}$ and $Z_{RO}$ are as given in expression (a) with the exception that the P subscript is related to the particular phase of the $V_{AM4}$ signal.

* * * * *